(12) United States Patent
Aguilar Ruelas

(10) Patent No.: US 10,093,205 B2
(45) Date of Patent: Oct. 9, 2018

(54) HEAD REST WITH A COMPARTMENT FOR A TRAVEL PILLOW

(71) Applicant: FORD GLOBAL TECHNOLOGIES, LLC, Dearborn, MI (US)

(72) Inventor: Eduardo Arturo Aguilar Ruelas, Mexico City (MX)

(73) Assignee: Ford Global Technologies, LLC, Dearborn, MI (US)

( * ) Notice: Subject to any disclaimer, the term of this patent is extended or adjusted under 35 U.S.C. 154(b) by 157 days.

(21) Appl. No.: 14/829,271

(22) Filed: Aug. 18, 2015

(65) Prior Publication Data

US 2017/0050545 A1 Feb. 23, 2017

(51) Int. Cl.
- *B60N 2/48* (2006.01)
- *B60R 7/04* (2006.01)
- *B60N 2/809* (2018.01)

(52) U.S. Cl.
CPC ........... *B60N 2/4808* (2013.01); *B60N 2/809* (2018.02); *B60R 7/043* (2013.01)

(58) Field of Classification Search
CPC .... B60N 2/4808; B60N 2/4876; B60R 7/043; A47C 7/383
See application file for complete search history.

(56) References Cited

U.S. PATENT DOCUMENTS

| | | | | |
|---|---|---|---|---|
| 2,404,109 A * | 7/1946 | Steele | .................... | B64D 17/78 224/153 |
| 3,437,374 A * | 4/1969 | Bennett | .................... | A47C 4/54 297/188.01 |
| 3,449,011 A * | 6/1969 | Edwards | ............... | B60N 2/4876 297/188.04 |
| 3,568,890 A * | 3/1971 | Leachman | ............... | B60N 3/10 222/183 |
| 4,247,961 A * | 2/1981 | Masch | ................. | A47G 9/1045 297/397 |
| 4,974,903 A * | 12/1990 | Lipschitz | ............. | B60N 2/4876 297/188.01 |
| 5,139,310 A * | 8/1992 | Itoh | ...................... | B60N 2/4876 297/183.6 |
| 5,354,119 A * | 10/1994 | Nicholas | ................. | B60R 7/005 224/275 |

(Continued)

FOREIGN PATENT DOCUMENTS

| | | |
|---|---|---|
| DE | 3409097 A1 | 11/1984 |
| JP | H05305026 A | 11/1993 |

(Continued)

OTHER PUBLICATIONS

English machine translation for DE3409097A1.

(Continued)

*Primary Examiner* — David R Dunn
*Assistant Examiner* — Tania Abraham
(74) *Attorney, Agent, or Firm* — Vichit Chea; King & Schickli, PLLC

(57) ABSTRACT

A head rest assembly is provided for a motor vehicle. The head rest assembly includes a body having a storage compartment and a cover for mating with the body and enclosing the storage compartment. Further, the head rest assembly includes a travel pillow that is held in the storage compartment where it is made conveniently available for use by a passenger of the motor vehicle.

8 Claims, 5 Drawing Sheets

(56) References Cited

U.S. PATENT DOCUMENTS

| | | | |
|---|---|---|---|
| 5,713,633 | A | 2/1998 | Lu |
| 6,669,285 | B1 | 12/2003 | Park et al. |
| 6,986,190 | B2 | 1/2006 | Jost |
| 7,188,895 | B1 | 3/2007 | Espina et al. |
| 7,188,896 | B2 | 3/2007 | Embach |
| 7,213,877 | B2 | 5/2007 | Gramss |
| 2006/0001307 | A1 | 1/2006 | Embach |
| 2013/0147239 | A1 | 9/2013 | Dinger et al. |
| 2013/0229035 | A1 | 9/2013 | Dinger et al. |

FOREIGN PATENT DOCUMENTS

| | | |
|---|---|---|
| JP | 2000203365 A | 7/2000 |
| KR | 20010047227 A | 6/2001 |
| WO | 2010067213 A1 | 6/2010 |

OTHER PUBLICATIONS

English Machine Translation of JP2000203365A.
English Machine Translation of JPH05305026A.
Search Report dated Dec. 8, 2017 for Turkey Patent Application Serial No. 2016/11520 filed Aug. 16, 2016.

\* cited by examiner

HEAD REST WITH A COMPARTMENT FOR A TRAVEL PILLOW

TECHNICAL FIELD

This document relates generally to the motor vehicle equipment field and, more specifically, to a head rest assembly incorporating a storage compartment holding a travel pillow.

BACKGROUND

Motor vehicle seats are currently equipped with head rests to provide a safety function by limiting whiplash and head and neck injuries in the event of an accident. Head rests, however, do not provide the geometry necessary to provide comfortable support to the head and neck of the passenger during napping or dozing. More specifically, the head and neck generally fall to an awkward angle which leaves the passenger with a stiff and sore neck upon awakening instead of fully refreshed for further activities.

In recognition of this shortcoming of motor vehicle head rests, this document relates to a head rest equipped with a hidden storage compartment which holds a travel pillow. That travel pillow may be removed by a passenger and positioned between the head rest and neck of the passenger to provide better support and a more comfortable head and neck position. This will allow the passenger to fall asleep sooner, stay asleep longer and awakened refreshed without any significant neck discomfort. Accordingly, the head rest assembly set forth in this document represents a significant advance in passenger comfort in the motor vehicle art.

SUMMARY

In accordance with the purposes and benefits described herein, a head rest assembly is provided for a motor vehicle. The head rest assembly comprises a body including a storage compartment, a cover mating with the body and enclosing the storage compartment and a travel pillow held in the storage compartment. The head rest assembly may include a first post and a second post for supporting the body on a seat of a motor vehicle. Further the cover may include a first channel receiving the first support post and a second channel receiving the second support post.

In one possible embodiment, the body and travel pillow are identical in color. In another possible embodiment the body, the cover and the travel pillow are all identical in color. In still another embodiment, the cover is pivotally connected to the body. More specifically, the cover may pivot at a top end and open at a bottom end.

In accordance with yet another aspect, a motor vehicle seat is provided incorporating the head rest assembly described in this document.

In accordance with yet another aspect, a method is provided for storing a travel pillow in a motor vehicle. That method may be broadly described as comprising the steps of configuring a head rest assembly with a storage compartment sized and shaped to hold a travel pillow and storing a travel pillow in the storage compartment. Further, the method may include providing the head rest assembly with a removable cover. Alternatively, the head rest assembly may be provided with a hinged cover.

In the following description, there are shown and described several preferred embodiments of the head rest assembly. As it should be realized, the head rest assembly is capable of other, different embodiments and its several details are capable of modification in various, obvious aspects all without departing from the head rest assembly as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the head rest assembly and together with the description serve to explain certain principles thereof. In the drawing figures.

Figure 3A:
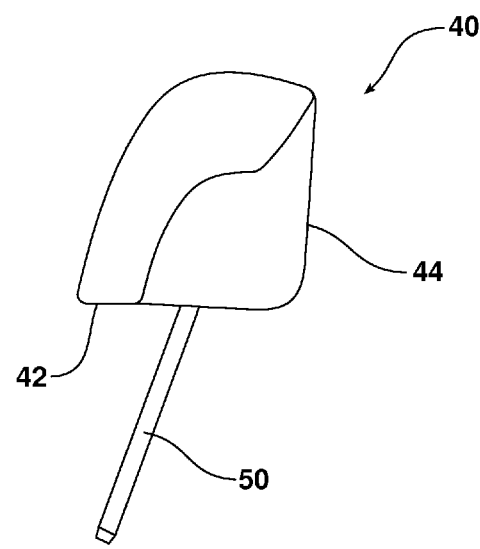
Figure 3B:
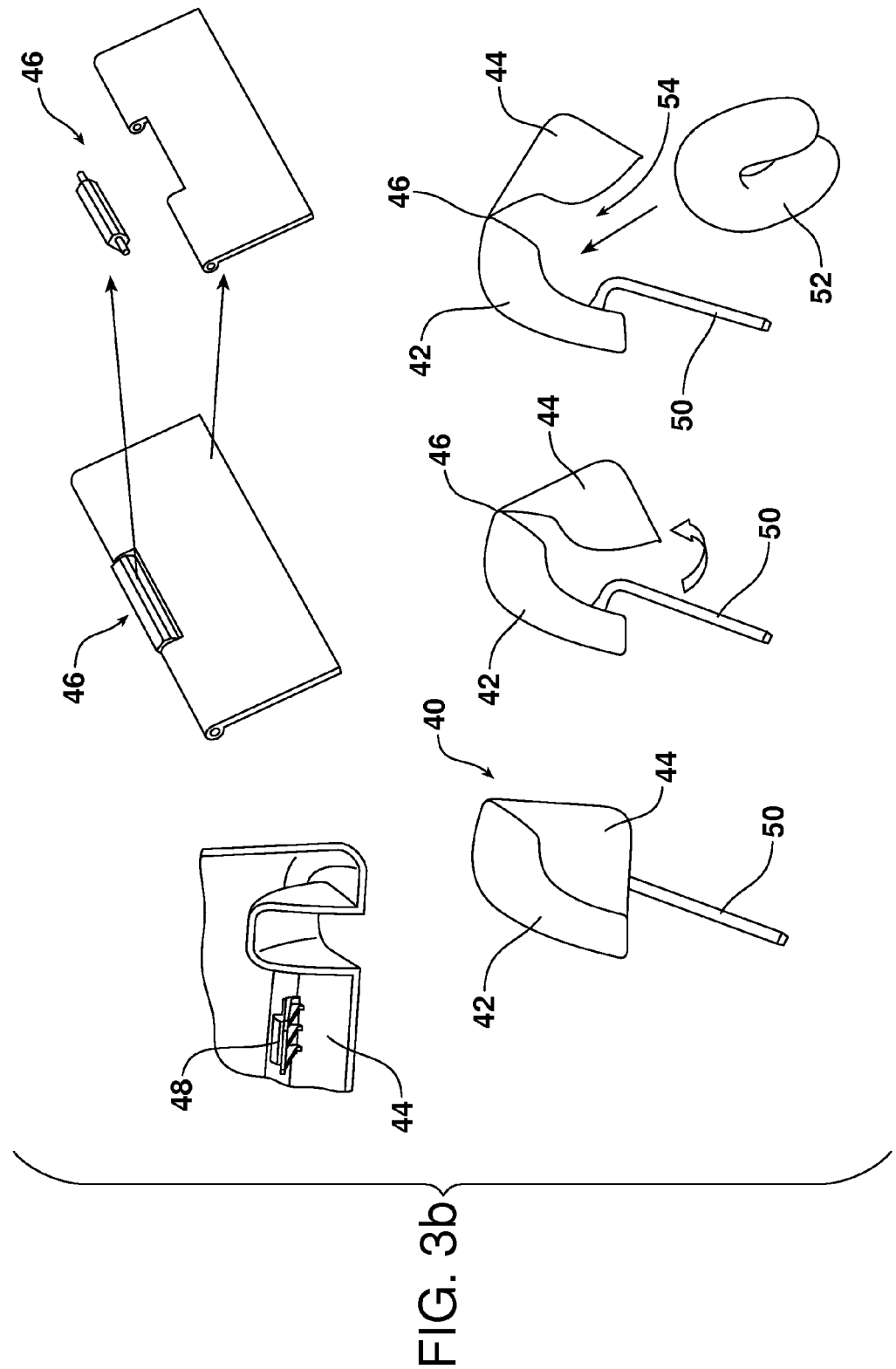

FIGS. 3a-3b are various views of a second embodiment of the head rest assembly. FIG. 3a shows this head rest assembly in the closed position. FIG. 3b shows the cover of the head rest assembly being hinged open so that the travel pillow may be inserted into a hidden storage compartment defined by the body and hinged cover of the head rest assembly.

Reference will now be made in detail to the present preferred embodiments of the head rest assembly, examples of which are illustrated in the accompanying drawing figures.

DETAILED DESCRIPTION

Figure 1:
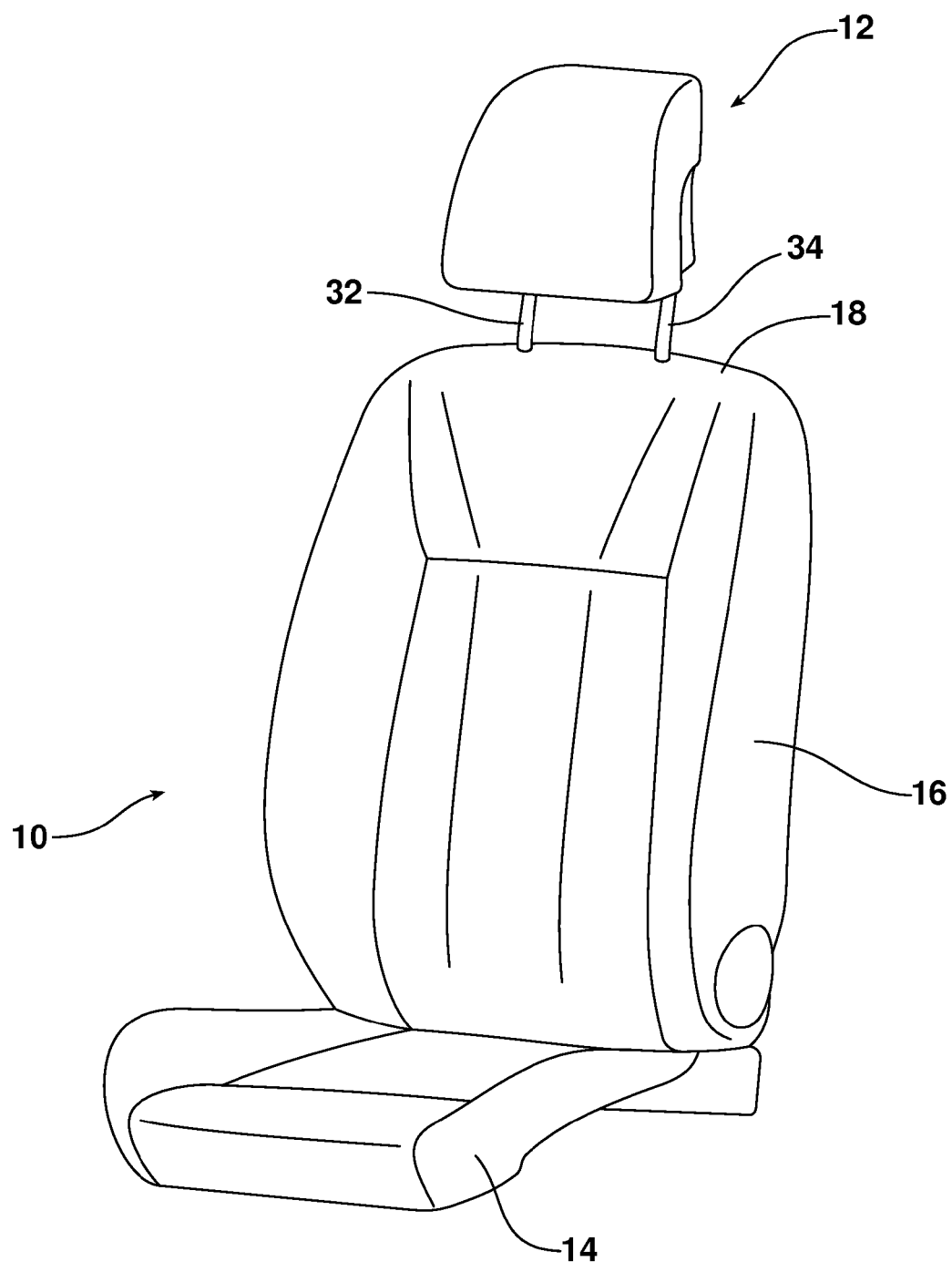
FIG. 1 is a perspective view of a motor vehicle seat incorporating the head rest assembly that is the subject matter of this document.

Reference is now made to FIG. 1 illustrating a motor vehicle seat incorporating the head rest assembly that will be described in greater detail below. As illustrated, the motor vehicle seat 10 includes a seat portion 14 and a back portion 16. The head rest assembly 12 is carried on the top edge 18 of the back portion 16.

Figure 2A:
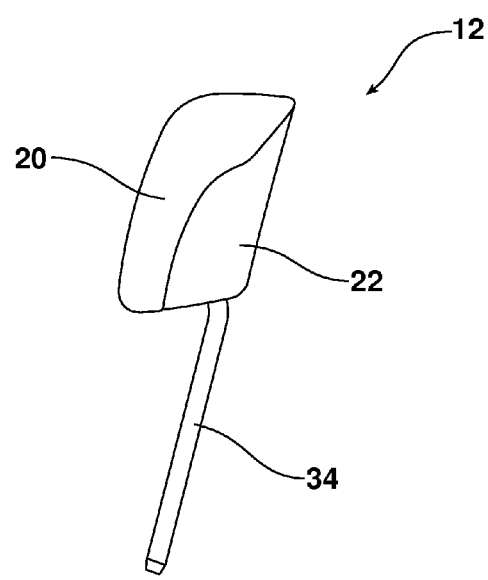
FIG. 2a is a side elevational view of a first possible embodiment of the head rest assembly.
Figure 2B:
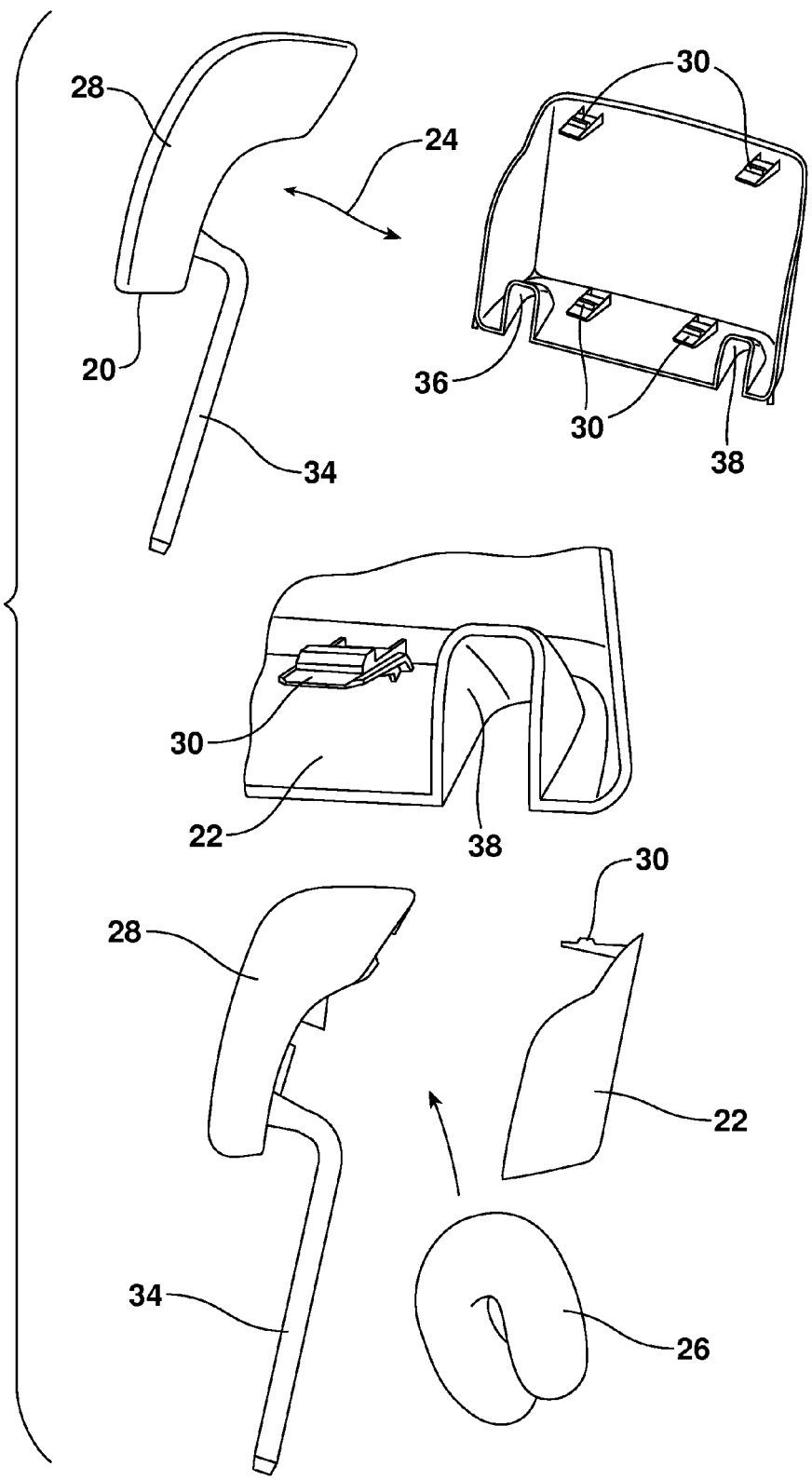
FIG. 2b is an exploded perspective view of the first embodiment of the head rest assembly illustrated in FIG. 2a showing how the cover may be removed from the body as well as how a travel pillow is received and stowed in a hidden compartment formed by the cover and body.

As illustrated in FIGS. 1 and 2a-2b, the head rest assembly 12 includes a body 20, a cover 22 for mating with the body and enclosing a hidden storage compartment 24 formed by the body 20 and the cover 22 and a travel pillow 26 that is held in the storage compartment.

More specifically, the body 20 may comprise a soft cushion or upholstered face 28 overlying a molded support structure that is hidden from view. The cover 22 may be molded from plastic, composite polymer or other appropriate material. One or more integral resilient attachment clips 30 may be utilized to secure the cover 22 to the body 20 in the closed position.

As further illustrated in FIGS. 1 and 2a-2b, the head rest assembly 12 also includes a first post 32 and a second post 34 for connecting to and supporting the body 20 and the entire head rest assembly 12 on the back portion 16 of the motor vehicle seat 10. The cover 22 may include a first channel 36 for receiving and providing clearance for the first post 32 and a second channel 38 for receiving and providing clearance for the second post 34 when the cover 22 is secured to the body 20 and in the closed position. As noted above, resilient attachment clips 30 complete the connection of the cover 22 to the body 20.

Reference is now made to FIGS. 3a-3b illustrating a second embodiment of the head rest assembly 40. The head rest assembly 40 includes a body 42 and a cover 44. In this illustrated embodiment, the cover 44 is connected to the body 42 by means of a hinge assembly 46 at a top end of the body 42 and one or more resilient attachment clips 48 at a lower end thereof which engage a hidden flange or shoulder (not shown) on the body 40 when the cover is secured in the closed position as illustrated in FIG. 3a. As illustrated in FIGS. 3a-3b, the head rest assembly 40 also includes mounting posts 50 (only one visible in the drawing figures) for securing the head rest assembly 40 to a motor vehicle seat 10 in the same manner as illustrated in the first embodiment of the head rest assembly 12 illustrated in FIGS. 1 and 2a-2b.

As illustrated in FIG. 3b, when the cover 44 of the head rest assembly 40 is opened about the living hinge 46, a travel pillow 52 may be inserted into the hidden storage compartment 54 formed by the body 42 and cover 44 (note action arrow in FIG. 3b). The hinged cover 44 may then be fully closed to conceal the travel pillow 52 completely within the head rest assembly 40 (note FIG. 3a).

In any possible embodiment, including the head rest assembly embodiment 12 illustrated in FIGS. 1 and 2a-2b and the head rest assembly embodiment 40 as illustrated in FIGS. 3a-3b, the body 20/42 and the travel pillow 26/52 may be identical in color so as to provide color coordination between the travel pillow, the body and the other components of the motor vehicle such as the seat portion 14 and seat back portion 16 of the seat 10. Of course, it should also be appreciated that the cover 22/44 could also be of the same identical color if desired. Of course, the use of coordinated contrasting colors is also appropriate in order to provide an enhanced aesthetic appearance for the motor vehicle interior including the seat 10, the head rest assembly 12/40 and the travel pillow 26/52.

As should be further appreciated, the first and second embodiments of the head rest assembly 12, 40 illustrated above are useful in a new and improved method for storing a travel pillow in a motor vehicle. More specifically, that method comprises configuring a head rest assembly 12/40 with a storage compartment 24/50 sized and shaped to hold a travel pillow 26/52. Further, the method includes the step of storing the travel pillow 26/52 in the storage compartment 24/50 where it can be hidden from view when not in use. Further, it should be appreciated that the head rest assembly 12/40 provides a particularly convenient place to store a travel pillow 26/52 where it can be conveniently accessed for use at virtually any time.

In a first embodiment of the head rest assembly 12, the method includes the additional step of providing the head rest assembly with a removable cover 22. In a second embodiment of the head rest assembly 40, the method includes providing the head rest assembly with a hinged cover 44.

The foregoing has been presented for purposes of illustration and description. It is not intended to be exhaustive or to limit the embodiments to the precise form disclosed. Obvious modifications and variations are possible in light of the above teachings. For example, while a substantially arcuate-shaped travel pillow is illustrated in the drawing figures, it should be appreciated that the travel pillow may take substantially any shape as desired so long as the travel pillow fits within the hidden storage compartment 24/54 of the head rest assembly 12/40. Further, while the hinged cover 44 is illustrated and described above as hinging at the top and opening at the bottom, it could hinge at the bottom and open at the top if desired. All such modifications and variations are within the scope of the appended claims when interpreted in accordance with the breadth to which they are fairly, legally and equitably entitled.

What is claimed:

1. A head rest assembly for a motor vehicle, comprising:
   a body including a storage compartment;
   a first post and a second post for supporting said body on a seat of a motor vehicle;
   a cover for mating with said body and closing said storage compartment, wherein said cover includes a first channel receiving said first post and a second channel receiving said second post; and
   a travel pillow held in said storage compartment.

2. The head rest assembly of claim 1, wherein said body and said travel pillow are identical in color.

3. The head rest assembly of claim 1, wherein said cover and said travel pillow are identical in color.

4. The head rest assembly of claim 1, wherein said body, said cover and said travel pillow are identical in color.

5. The head rest assembly of claim 1, wherein said cover is pivotally connected to said body.

6. A motor vehicle seat incorporating the head rest assembly of claim 5.

7. The head rest assembly of claim 1, wherein said cover pivots at a top end and opens at a bottom end.

8. A motor vehicle seat incorporating the head rest assembly of claim 1.

* * * * *